April 20, 1926.　　　　J. KEARNS ET AL　　　1,581,743
PNEUMATIC TIRE AND METHOD OF BUILDING THE SAME
Filed Nov. 19, 1923　　　2 Sheets-Sheet 2
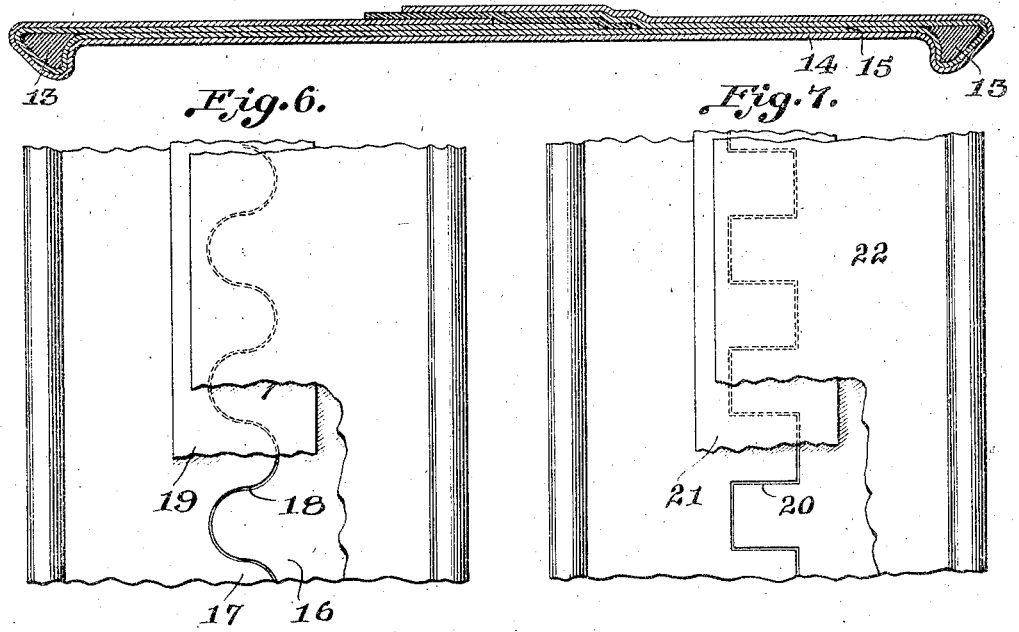
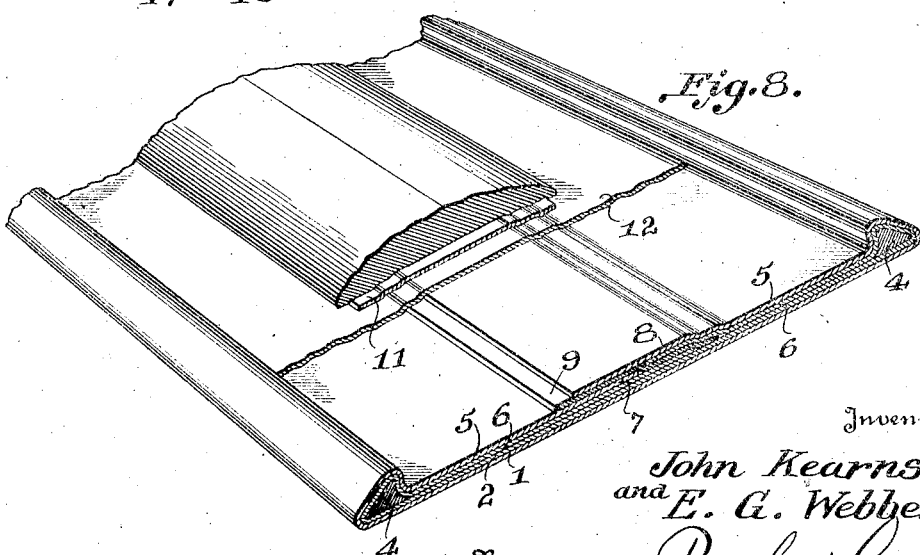
Inventors
John Kearns
and E. G. Webber
By Parker Cook
Attorney Patented Apr. 20, 1926.

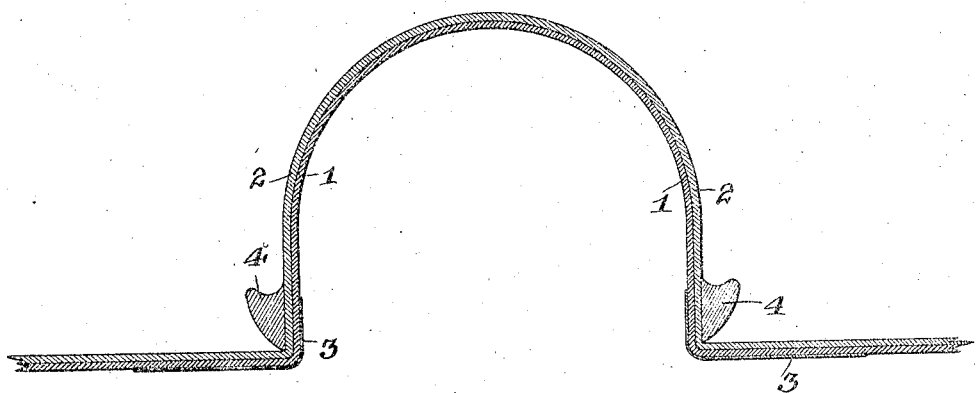
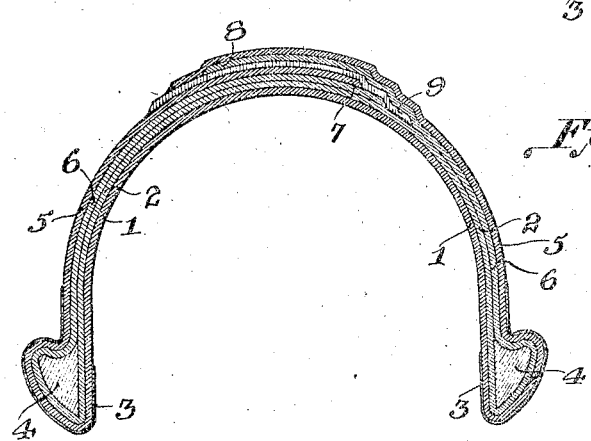
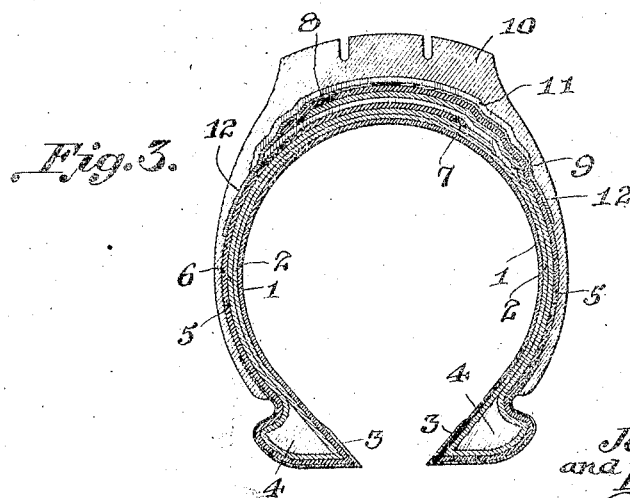

1,581,743

UNITED STATES PATENT OFFICE.

JOHN KEARNS AND EZRA GRAY WEBBER, OF CONSHOHOCKEN, PENNSYLVANIA, ASSIGNORS OF ONE-HALF TO LEE TIRE & RUBBER COMPANY, OF CONSHOHOCKEN, PENNSYLVANIA, A CORPORATION OF PENNSYLVANIA.

PNEUMATIC TIRE AND METHOD OF BUILDING THE SAME.

Application filed November 19, 1923. Serial No. 675,591.

*To all whom it may concern:*

Be it known that we, JOHN KEARNS and EZRA GRAY WEBBER, citizens of the United States of America, both residing at Conshohocken, in the county of Montgomery and State of Pennsylvania, have invented certain new and useful Improvements in Pneumatic Tires and Methods of Building the Same, of which the following is a specification.

Our invention relates to new and useful improvements in pneumatic cord tires and to the method of making the same, and has for an object to construct a pneumatic cord tire built up of a plurality of plies of cord fabric which are of such width that the plies may be folded back over the beads or bead strips to thereby double the plies at the side walls of the casing and form a still greater number of thicknesses centrally of the tire, the number of thicknesses of material at the center depending upon whether all the edges of the plies are made to overlap, or whether some are made to abut and the remainder to overlap.

In other words, taking two plies of cord fabric as an illustration, these may be properly placed one upon the other, and the plies being of such width that they may be folded back over the bead strips and the edges of the plies caused to overlap centrally of the carcass, and thus cause six layers of material centrally and peripherally of the carcass, or some of the edges of the folded over portion may just abut, and in this instance, five layers of cord material would exist centrally of the tire. When two or more edges are caused to abut, however, a gum strip is used to overlap one of the abutting edges, and to underlie the other, thus adding another thickness of material across the center of the carcass.

Still another object of the invention is to form a pneumatic tire of cord fabric, the width of the plies being such that they may be folded back over the bead strips and caused to overlap either on the outside of the carcass, or on the inside of the carcass.

Still another object of the invention is to provide a tire which is formed by stretching plies on a pulley band or drum, the plies being of such width that after the bead strips are placed in position, the several plies may be folded back over the bead and overlap centrally of the carcass, some of the edges of the plies which extend in one direction, arranged to interlock with the edges of the plies extending in the opposite direction.

In a co-pending application, filed by us on November 19, 1923, bearing Serial No. 675,592, we have shown a tire of this construction to illustrate how the apparatus shown in that application may be used to build a tire of this form, although this tire, which forms the subject matter of the present application, might be built on a different form of rotatable drum.

Still another object of the invention is to so construct a tire carcass that it will have a greater number of plies of cord fabric centrally of the tire than along the side walls of the tire, due to the fact that the plies are not only folded back over each other, but the edges thereof, are caused to overlap.

Still another object of the invention is to provide a tire and a method of forming the same, wherein the tire may be made in a very rapid manner, due to the fact that a skilled operator can more quickly fold over and lap the several plies of cord fabric than he could apply four or six plies narrower in width to the pulley band or drum.

Still another object of the invention is to form a tire which will be relatively cheap to manufacture, relatively easy to build and highly efficient in service.

With these and other objects in view, the invention consists in certain new and novel features of construction and combination of parts as will be hereinafter more fully described and pointed out in the claims.

Referring now to the drawings,

Fig. 1 is a diagrammatic view showing two plies of cord fabric before they are folded around the bead, the plies being shown extending in a U-shape for the sake of clearness;

Fig. 2 shows these two plies lapped and with a gum strip inserted between two of the plies and the carcass approaching its tire shape;

Fig. 3 shows a completed tire of the overlapped sections together with gum strip, breaker stock and the tread in position; each of the sections showing overlapping;

Fig. 4 is a sectional view of the overlapped plies of cord fabric as they will appear on a drum with a gum strip between two of the overlapped portions, the lapping edges appearing on the outside of the carcass;

Fig. 5 is a similar view inverted and with the overlappings inside the carcass;

Fig. 6 is a fragmentary top plan view showing how two of the opposite edges of the folded over fabric may interlock, a gum strip being placed over the interlocked portion, a portion of the outside ply being broken away for the sake of clearness;

Fig. 7 is a similar view, the interlocking sections being of slightly different configuration; and Fig. 8 is a fragmentary perspective showing how the carcass will appear on the flat drum before the same is centrally and circumferentially expanded, two edges of the plies shown abutting.

Referring now to the drawing, and particularly to Fig. 1, there are shown two plies of the ordinary cord fabric 1 and 2, these plies being disposed one upon the other so that the cords of the plies extend angularly to each other as is the well-known practice. There are also shown the two chafing strips 3 and the bead strips 4.

In this figure, the plies are shown in a U-shaped configuration, this method of showing being for the purpose of clearness of description and illustration as to the way the plies may be folded. In reality, the cord plies are laid flat around a pulley band or circular drum (not shown) and will have the appearance as illustrated in Fig. 4, or in the modified form, Fig. 5; and also as illustrated in the fragmentary perspective in Fig. 8. A form of drum on which these tires may be conveniently manufactured is shown in our co-pending application filed November 19, 1923, bearing Serial No. 675,592.

These two plies designated by the numerals 1 and 2 are of such width that they may be folded back over the bead strips 4 as clearly shown in Figs. 4 and 8.

Referring now more specifically to Fig. 4, it will be seen that the ply designated by the figure 1, when folded back over the bead strip will form a ply designated by the numeral 5, and ply 2, when also folded, will form a ply as designated by the numeral 6. The left edge 7 of the portion of the ply designated by the numeral 5, it will be noticed, does not overlap the other edge 8 of the portion of the ply designated by the numeral 5, but stops a short distance from it so that a gum splice strip 9 may be interposed between the two said edges 7 and 8, overlapping the one and underlying the other. This gum strip may or may not be used, and the edges 7 and 8 may overlap, rather than abut if desired, or the gum strip may be inserted over these edges if they overlap as well as interposed between them. As a rule a gum strip will be used in either instance.

In Fig. 2, the carcass is shown before it has been drawn in to tire shape to illustrate the disposition of the circumferential edges of the several plies and their central meeting point relative of the width of the carcass.

In Fig. 3, there is shown the tire casing as it will appear when completed: in this instance, the tread stock 10 having been added, the breaker strip 11 and the cushion stock 12, and it will also be noticed in this view, that the several edges of the plies overlap each other with a gum strip between some of the overlapping edges, rather than having two of the edges abut and a gum strip overlapping one edge and underlying the other. Of course, the necessary flipper strips will be used and other little gum bands which are generally used in the making up of a pneumatic tire.

The component parts of the carcass will all be stretched upon the drum and several of the parts rolled and calendered, after which it will be stretched centrally and circumferentially to the desired shape, which operation may be performed as shown in the previous application referred to by us and bearing Serial No. 675,592. After the tire has been so shaped and stretched, it may be subjected to the ordinary vulcanizing process.

We have shown in Fig. 5, a tire carcass formed in a similar way, but in this instance, when the tire is built up on a drum, the bead strips 13 will be inverted with relation to the two plies 14 and 15, after which the two plies will be folded back to form the inner and outer plies, and a still further additional thickness exists centrally of the carcass caused by the overlapping edges; and it is to be noticed that the carcass is inverted so that the laps, or overlapping portion of the carcass, will be on the inside, rather than the outside of the carcass.

In Figs. 6 and 7, a slight change is made in the arrangement of the plies of the carcass, in so far as the edges 16 and 17 of one of the two plies shown, are cut to intermesh along the circumferential line 18, while a gum strip 19 may be placed over these edges. The strip 19 takes the place of the gum strip 9, which in the other form shown, fits in between the overlapping edges or between the abutting edges. In Fig. 7, these intermeshing portions are substantially square shape as at 20, a gum strip 21 extending over them and the outer ply 22 extending over this last mentioned gum strip.

In these last mentioned forms, the adjacent edges not only abut, but interlock, thereby adding strength and rigidity to the whole carcass.

From the foregoing, it will be seen that by cutting the fabric bands of sufficient width, they may be placed on a drum or pulley band and after the bead strips applied, may be folded back over the bead strips towards each other and the edges caused to abut, overlap, or interlock, or some of the edges be made to abut and others to interlock centrally and circumferentially of the tire carcass. Gum strips may be placed between abutting edges, over abutting edges, or in between overlapping edges, and of course, the ordinary cushion stock, tread stock, chafing strips and flipper strips may be applied to make up the completed carcass.

Although we have shown but two plies of cord fabric which are designed to be folded back and lapped, it is to be understood that any number of plies may be used in the same manner. A tire formed in this way is relatively strong, presents the greatest number of thicknesses of material at the desired points about the tire, and is one which can be made in a relatively short space of time and thereby lessen the cost of production.

Although I have specified a cord fabric, it is understood that this is the preferable fabric, but I do not wish to be limited to a cord fabric as it may be constructed of square woven fabric on an iron core.

Many slight changes might be made without in any way departing from the spirit and scope of the invention.

Having thus described the same, what we claim as new and desire to secure by Letters Patent is:—

1. A pneumatic tire comprising in part several plies of fabric, bead strips, said plies folded back over said bead strips and some of the plies having overlapping edges and other of the plies having abutting edges circumferentially and centrally of the tire, and a gum strip interposed between the abutting edges and underlying the overlapping edges for sealing the several edges.

2. A pneumatic tire comprising several bands of fabric, bead strips, said bands being of sufficient width to be folded back over said bead strips and some of the edges overlapping and other of the edges nearly abutting, and a gum strip positioned under one abutting edge and extending over an opposite abutting edge and underlying the overlapping edges of the fabric for sealing the several edges a cushion and a tread stock centrally of the casing and said gum strip also extending centrally and about the periphery of the tire.

3. The method of forming a pneumatic cord tire which consists in stretching several plies of cord fabric on a drum, applying the bead strips, the width of the plies being such that they may be folded over said bead strips and some of the edges overlap circumferentially and centrally of said tire and some of the edges substantially abutting, applying a gum strip between two of the overlapping edges and over and under the said abutting edges for sealing the same, applying the cushion stock and tread, expanding the carcass circumferentially and centrally to tire shape and vulcanizing the same.

In testimony whereof we affix our signatures.

JOHN KEARNS.
EZRA GRAY WEBBER.